(12) United States Patent
Walton et al.

(10) Patent No.: US 7,131,454 B2
(45) Date of Patent: Nov. 7, 2006

(54) PISTON SEALING MECHANISM FOR LIQUID ADDITIVE INJECTION PUMP

(75) Inventors: Frank A. Walton, Fort Worth, TX (US); James E. Williams, Richardson, TX (US)

(73) Assignee: Dosmatic, U.S.A. Inc., Carrollton, TX (US)

( * ) Notice: Subject to any disclaimer, the term of this patent is extended or adjusted under 35 U.S.C. 154(b) by 218 days.

(21) Appl. No.: 10/440,335

(22) Filed: May 16, 2003

(65) Prior Publication Data

US 2004/0226605 A1   Nov. 18, 2004

(51) Int. Cl.
*G05D 11/035*   (2006.01)

(52) U.S. Cl. .............................. 137/99; 92/207; 92/209; 277/437; 277/439

(58) Field of Classification Search .................. 137/99; 92/209, 207; 277/437, 439, 403
See application file for complete search history.

(56) References Cited

U.S. PATENT DOCUMENTS

| | | | | |
|---|---|---|---|---|
| 1,977,075 | A * | 10/1934 | Magnuson | 92/240 |
| 3,866,621 | A * | 2/1975 | Greene, Jr. | 137/99 |
| 4,572,229 | A * | 2/1986 | Mueller et al. | 137/99 |
| 4,601,235 | A * | 7/1986 | Roberts | 92/245 |
| 5,433,240 | A * | 7/1995 | Mueller | 137/99 |
| 6,357,466 | B1 * | 3/2002 | Walton et al. | 137/99 |

* cited by examiner

*Primary Examiner*—Stephen M. Hepperle
(74) *Attorney, Agent, or Firm*—Scott L. Harper; Carstens & Cahoon, LLP

(57) ABSTRACT

A system for injecting a predetermined amount of a secondary fluid into a primary fluid stream uses a liquid additive injection pump driven by a fluid powered motor driven by the primary fluid stream. The liquid additive pump has a reciprocating piston movable within a cylinder between upstroke and downstroke positions to meter the secondary fluid and a piston sealing mechanism comprising spaced-apart distal and proximal sealing elements. The distal piston-sealing element is flared in the direction of piston downstroke and the proximal piston-sealing element is flared in the direction of piston upstroke.

11 Claims, 5 Drawing Sheets

PISTON SEALING MECHANISM FOR LIQUID ADDITIVE INJECTION PUMP

FIELD OF THE INVENTION

The present invention relates generally to a liquid additive injection pump powered by a fluid motor driven by a primary fluid stream to which the liquid additive is to be injected. More specifically, the present invention relates to an improved piston sealing mechanism for the reciprocating piston of the additive injection pump.

BACKGROUND OF THE INVENTION

Fluid powered motors driving an additive injection pump connected to a source of fluid additives are typically installed in a line containing primary fluid. Operation of the fluid motor reciprocates a piston within a cylinder of the additive injection pump to draw a quantity of secondary fluid into the primary fluid with each reciprocation. Such devices have been applied to add medication to drinking water for poultry and livestock, treat water with additives, add fertilizer concentrate to irrigation water, or add lubricant or cleaning agents to water. In liquid additive injection pumps, such as that shown in U.S. Pat. No. 4,809,731, piston ring seals have been used to engage the bore wall of the cylinder as the piston is reciprocated therein.

SUMMARY OF THE INVENTION

The present invention provides a system to inject a secondary fluid into a primary fluid. a fluid powered motor driven by a primary fluid stream drives a liquid additive injection pump having a reciprocating piston movable within a cylinder between upstroke and downstroke positions to meter a secondary fluid. A piston sealing mechanism is movable with the reciprocating piston. The sealing mechanism comprises spaced-apart distal and proximal sealing elements. The distal sealing element is flared in the direction of piston downstroke travel and the proximal sealing element is flared in the direction of piston upstroke travel.

The piston is connected to a rod, which may include first and second circumferential grooves with first and second retainer rings. The first retainer ring bears against the distal sealing element during piston downstroke to apply a force that urges the distal sealing element against the cylinder wall. The second retainer ring bears against the proximal sealing element during piston upstroke to apply a force that urges the distal sealing element against the cylinder wall.

Each of the distal and proximal sealing elements has an overall frustoconical configuration. Also, each of the distal and proximal sealing elements can include within the frustoconical configuration an outer wall having an outer surface that flares at a slope angle of about 6 degrees relative to the longitudinal axis and an inner surface that flares at a slope angle in the range of about 10–11 degrees, whereby the outer wall has a tapered, narrowing cross-section in the direction of flaring. Further, each of the distal and proximal sealing elements can have an inner wall, spaced inwardly from the outer wall to form a cavity between the outer and inner walls. The inner wall may have an outer surface that inwardly slopes away from the outer wall at an angle in the range of about 8–9 degrees, whereby the inner wall has a tapering cross-section in the direction of flaring of the sealing element.

DETAILED DESCRIPTION

Figure 1:
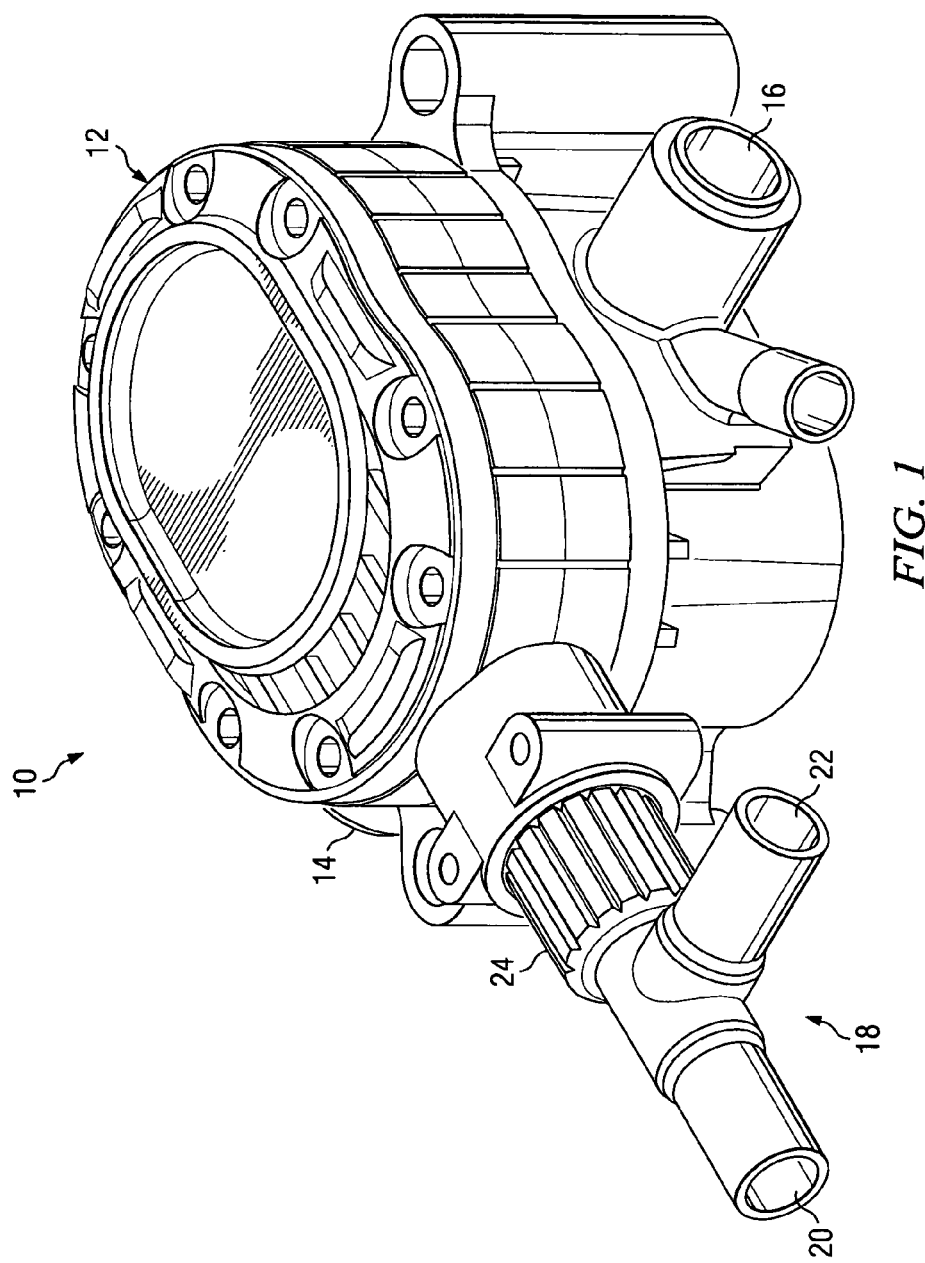
FIG. 1 is an illustration of a fluid motor powered liquid additive injection pump.

In FIG. 1, fluid motor powered liquid injection pump 10 is shown. A housing 12 encloses the fluid motor components. An inlet conduit 14 provides for acceptance of a primary fluid stream and outlet conduit 16 discharges the primary fluid stream. Mounted to housing 12 is liquid additive injection pump 18. An inlet conduit 20 provides for acceptance of a liquid additive and outlet conduit 22 provides for discharge of the liquid additive. The liquid additive will be drawn into pump 18 from an additive reservoir (not shown). The outlet conduit 22 is to be coupled to the outlet conduit 16 by a suitable plumbing connection (not shown). Metering of the liquid additive is adjustable by rotation of knob 24.

Figure 2:
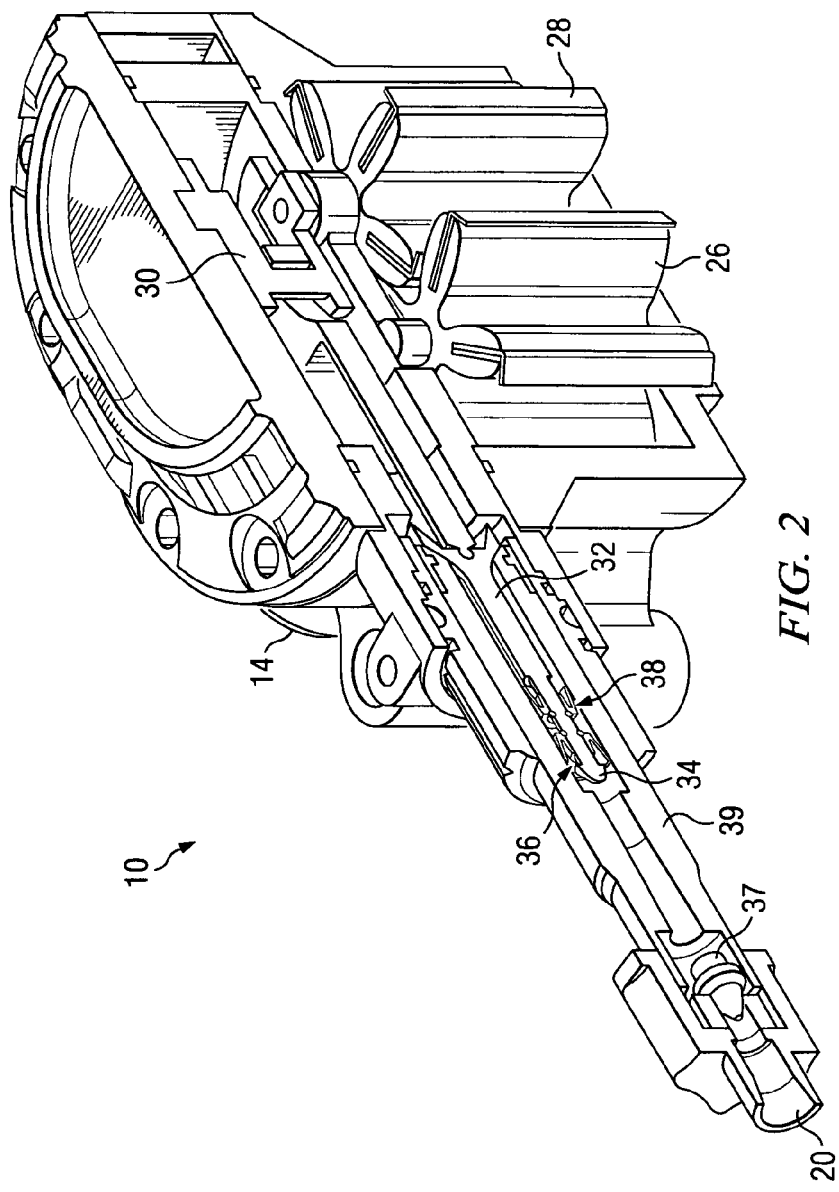
FIG. 2 is a vertical cross-section illustration of the fluid motor powered liquid additive injection pump of FIG. 1.

FIG. 2 shows the internal components of the fluid motor with housing 12. First and second impellers 26 and 28 are mounted for rotational movement in response to the primary fluid stream being introduced under pressure to inlet conduit 14. Rotation of impeller 28 rotates an offset, eccentric linkage 30. A reciprocating rod 32 is coupled to linkage 30. The rotational movement of impeller 28 is translated into reciprocal movement of rod 32. At the end of rod 32 is a piston 34 and spaced-apart distal and proximal piston sealing elements 36 and 38, which together form a piston sealing mechanism 35. At the inlet conduit a one-way valve 37 is mounted in the fluid flow path that leads to the interior of cylinder 39.

Figure 3:
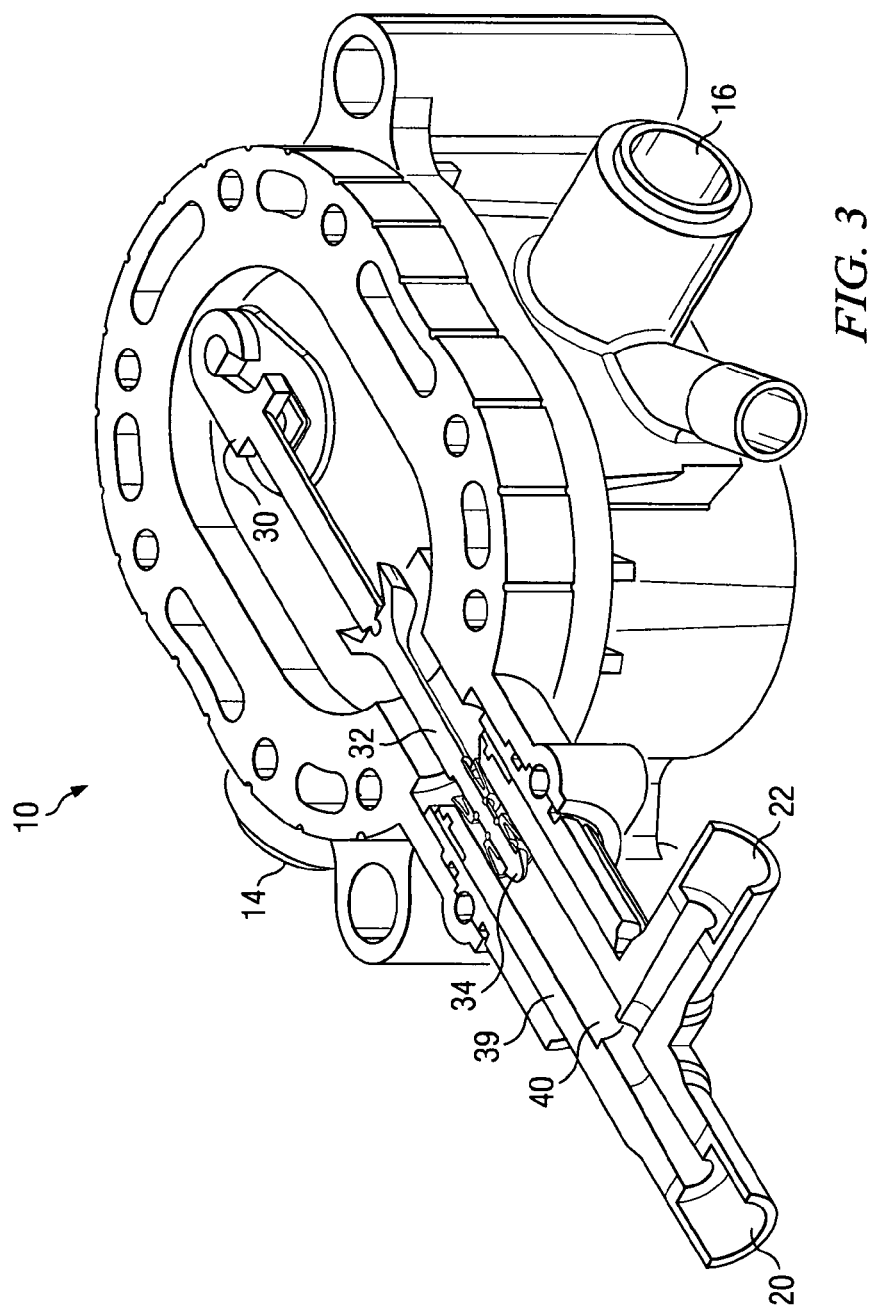
FIG. 3 is a first horizontal cross-section illustration of the fluid motor powered liquid additive injection pump of FIG. 1 showing the piston of the additive pump at the end of its downstroke.
Figure 4:
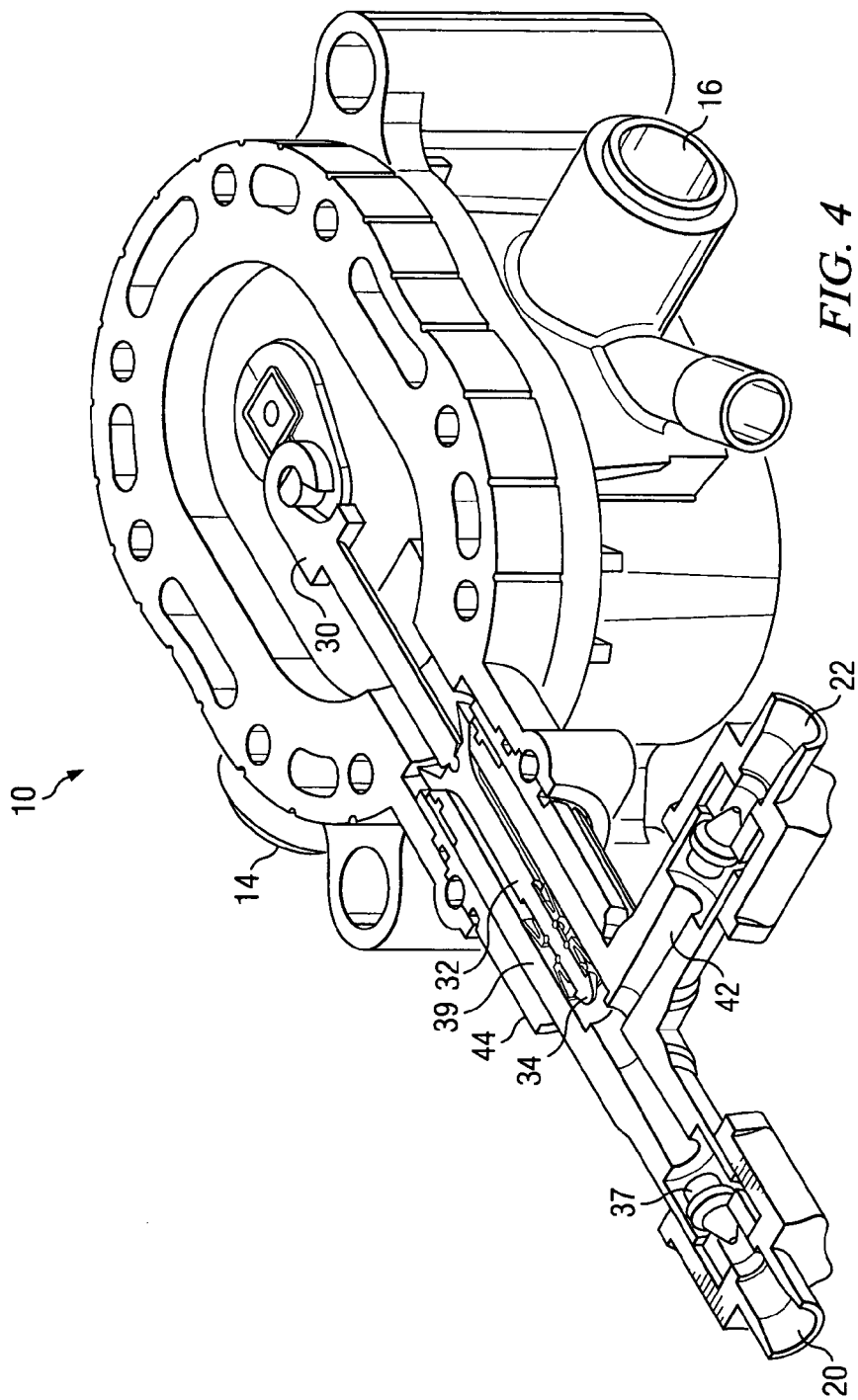
FIG. 4 is a second horizontal cross-section illustration of the fluid motor powered liquid additive injection pump of FIG. 1 showing the piston of the additive pump at the end of its upstroke.

FIG. 3 shows linkage 30 coupled to rod 32. Specifically, FIG. 3 shows rod 32 and piston 34 at the end of the upstroke of the reciprocating cycle of the liquid additive injection pump. Liquid additive is drawn into cavity 40 of cylinder 39 through valve 37 on the upstroke of piston 34. The downstroke position of piston 34 is shown in FIG. 4. On the downstroke, piston sealing element 36 forces the liquid additive in cavity 40 through channel 42 to be discharged from outlet conduit 22. To be observed is that cylinder 39 is axially movable relative to barrel 44 based upon rotation of knob 24. Thus, the internal volume of cavity 40 and the amount of liquid additive metered from the outlet conduit 22 can be varied as desired. Also, the flow rate of the primary fluid correspondingly alters the rate of rotation of impellers 26 and 28. The rotational rate of the impellers 26 and 28 in turn establishes the rate at which piston 34 is reciprocated within cylinder 39. In this fashion, the proportioning of liquid additive metered into the primary fluid stream is maintained as the primary fluid flow rate is varied.

Figure 5:
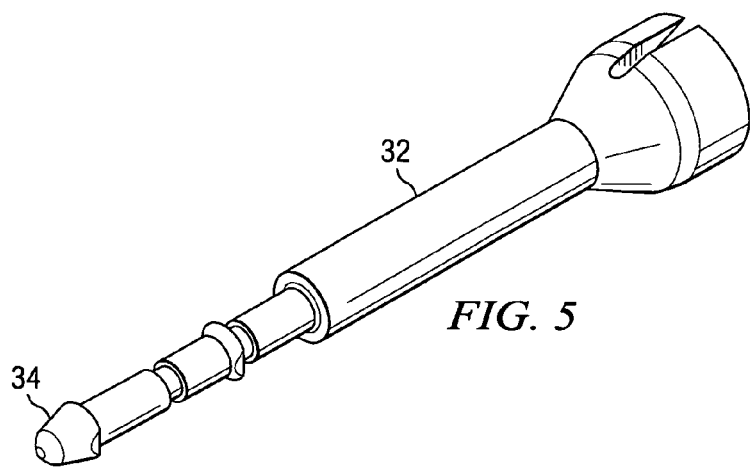
FIG. 5 is an illustration of the piston and piston rod of the fluid motor powered liquid additive injection pump of FIG. 1.
Figure 6:
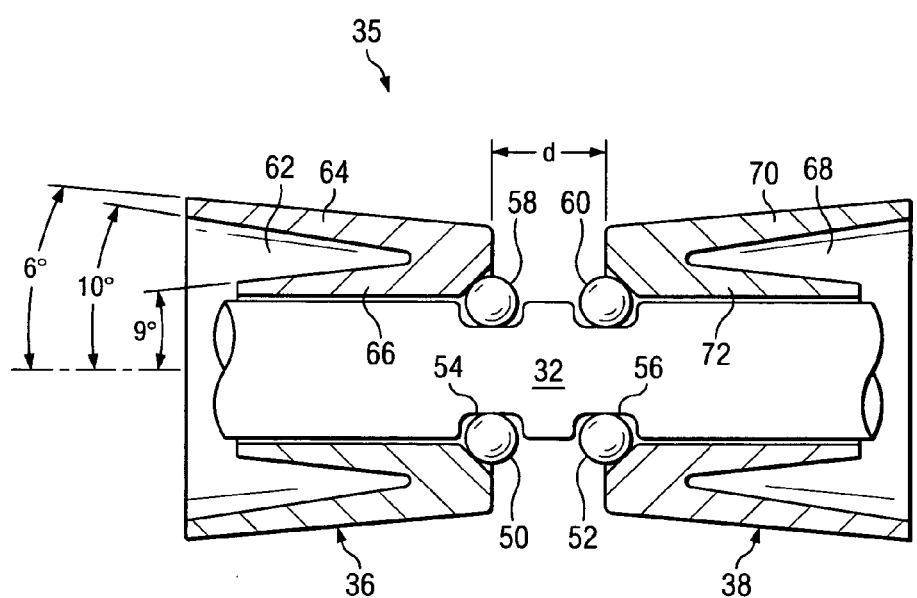
FIG. 6 is a cross-section of the piston sealing mechanism attached to a segment of the piston rod of the fluid motor powered liquid additive injection pump of FIG. 1.

In FIG. 5, the reciprocating rod 32 and piston 34 are shown. In FIG. 6, the piston sealing mechanism 35 is seen as comprising sealing elements 36 and 38 mounted to a segment of rod 32. The piston sealing element 36 is a distal sealing element and piston sealing element 38 is a proximal sealing element. Sealing elements 36 and 38 are separated by a distance "d." The distance spacing "d" is about 0.08". Sealing elements 36 and 38 are fixed in position on rod 32 by retainer rings 50 and 52. These rings fit into circumferential grooves 54 and 56 formed in rod 32. The end of sealing element 36 has a beveled surface 58 that bears against ring 54 as the piston moves in the downstroke. The end of sealing element 38 has a beveled surface 60 that bears against ring 56 as the piston moves in the upstroke. The surfaces 58 and 60 are beveled at an angle of about 30 degrees relative to the longitudinal central axis The sealing elements 36 and 38 are preferably formed using an elastomer material such as VITON, AFLAS or EPDM. The configuration of sealing elements 36 and 38 is essentially frustoconical. An internal cavity 62 for sealing element 36 is formed between an outer wall 64 and an inner wall 66, which gives a cup-shaped configuration. The inner wall 66 is part of a mounting hub for sealing element 36 that is affixed to rod 32. Similarly, an internal cavity 68 is formed for sealing element 38 between outer wall 70 and inner wall 72. The thickness of the outer walls of sealing elements 36 and 38 narrows from back to front in the direction of flaring. The outer surface of the outer walls of sealing elements 36 and 38 outwardly slopes at an angle of about 6 degrees from the longitudinal axis whereas the inner surface of the outer wall outwardly slopes at an angle of about 10–11 degrees. The inner wall of sealing elements 36 and 38 also narrows from back to front because the outer surface of the inner wall inwardly slopes at an angle of about 8–9 degrees. The configuration of sealing element 36 provides a flared configuration in the piston downstroke direction, whereas the configuration of sealing element 38 provides a flared configuration in the piston upstroke direction. Flaring of each sealing element in the direction of piston travel permits the element to provide an effective seal in one direction of piston movement and yet not impede movement of the piston in the opposite direction.

Although a specific embodiment of the invention has been set forth herein for purposes of explanation and illustration. It is to be understood that various alterations, substitutions, and modifications may be made to the embodiment described herein without departing from the spirit and scope of the invention as set forth in the appended claims.

What is claimed is:

1. A system to inject a secondary fluid into a primary fluid, comprising:
    a fluid powered motor driven by a primary fluid stream;
    a liquid additive injection pump driven by the fluid powered motor;
    said liquid additive injection pump having
    (a) a reciprocating piston movable within a cylinder between upstroke and downstroke positions to meter a secondary fluid; and
    (b) a piston sealing mechanism movable with the reciprocating piston and comprising spaced-apart distal and proximal sealing elements, said distal sealing element being flared in the direction of piston downstroke and the proximal sealing element being flared in the direction of piston upstroke;
    wherein the liquid additive injection pump includes a piston rod, and the spaced-apart distal and proximal sealing elements are carried thereon; and
    further wherein the piston rod includes first and second circumferential grooves and first and second retainer rings, said first retainer ring bearing against the distal sealing element during piston downstroke to apply a force that urges the distal sealing element against the cylinder and the second retainer ring bearing against the proximal sealing element during piston upstroke to apply a force that urges the distal sealing element against the cylinder.

2. The system of claim 1 wherein the fluid powered motor comprises a housing, an inlet conduit, an outlet conduit, and at least one impeller rotatable upon passage of a primary fluid stream between the inlet conduit and the outlet conduit.

3. The system of claim 2 wherein the fluid powered motor further comprises an eccentric arm linkage coupled to one of the impellers to translate the rotary movement of the impeller to reciprocating movement.

4. The system of claim 3 wherein the liquid additive injection pump includes a piston rod and the spaced-apart distal and proximal sealing elements are carried thereon and the piston rod is coupled to the eccentric arm linkage of the fluid powered motor.

5. The system of claim 4 wherein the piston rod includes first and second circumferential grooves and first and second retainer rings, said first retainer ring bearing against the distal sealing element during piston downstroke to apply a force that urges the distal sealing element against the cylinder and the second retainer ring bearing against the proximal sealing element during piston upstroke to apply a force that urges the distal sealing element against the cylinder.

6. The system of claim 1 wherein each of the distal and proximal sealing elements has a frustoconical configuration and comprises an outer wall having an outer surface that flares at a slope angle of about 6 degrees relative to the longitudinal axis and an inner surface that flares at a slope angle in the range of about 10–11 degrees, whereby the outer wall has a tapered cross-section in the direction of flaring.

7. The system of claim 6 wherein each of the distal and proximal sealing elements has an outer wall and an inner wall spaced inwardly from the outer wall to form a cavity between the outer and inner walls, the inner wall having an outer surface that inwardly slopes at an angle in the range of about 8–9 degrees, whereby the inner wall has a tapered cross-section in the direction of flaring of the sealing element.

8. The system of claim 1 wherein each of the distal and proximal sealing elements has a frustoconical configuration and each of the distal and proximal sealing elements has an outer wall and an inner wall spaced inwardly from the outer wall to form a cavity between the outer and inner walls.

9. The system of claim 1 wherein the distal and proximal sealing elements comprise an elastomeric material.

10. The system of claim 1 wherein the distal and proximal sealing elements are spaced apart about 0.08".

11. The system of claim 1 wherein the liquid additive injection pump further comprises means for adjusting the amount of secondary fluid metered during each piston stroke cycle.

* * * * *